UNITED STATES PATENT OFFICE.

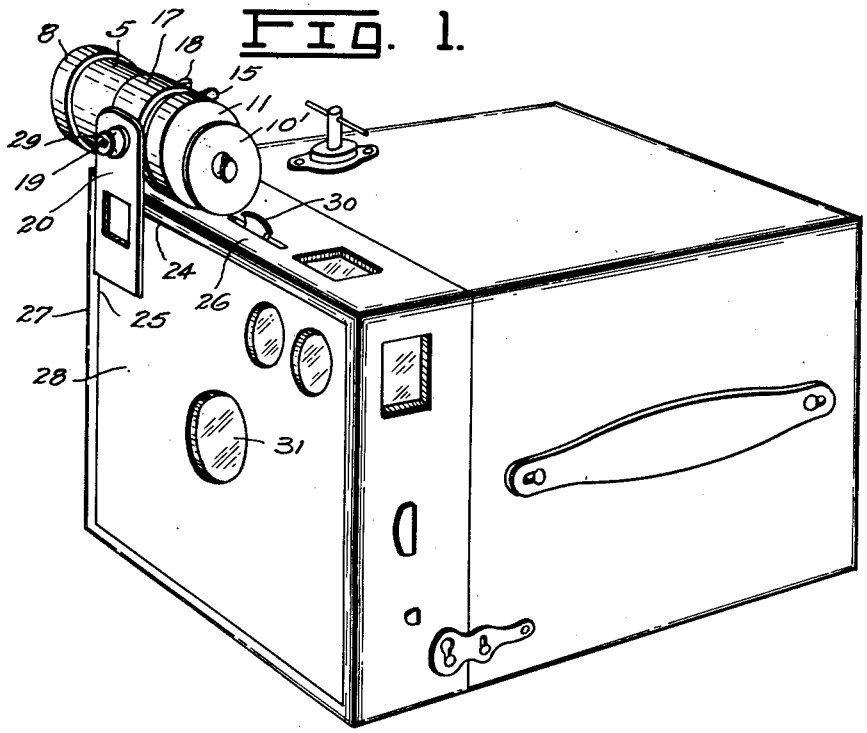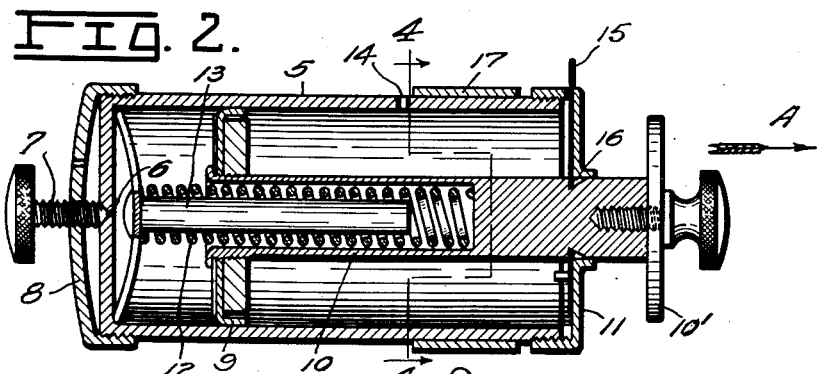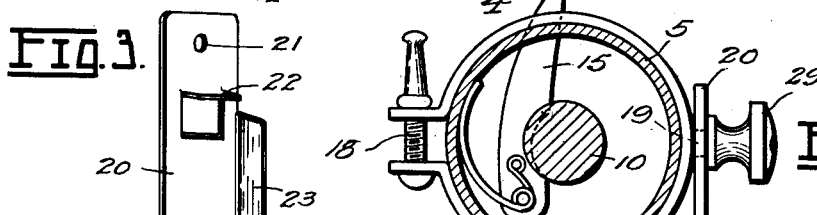

CHARLES L. E. SVENDSEN, OF KIRKLAND, AND CHARLES A. JOHNSON, OF SEATTLE, WASHINGTON.

AUTOMATIC CAMERA-SHUTTER TRIP.

1,377,528. Specification of Letters Patent. Patented May 10, 1921.

Application filed March 1, 1920. Serial No. 362,249.

*To all whom it may concern:*

Be it known that we, CHARLES L. E. SVENDSEN and CHARLES A. JOHNSON, citizens of the United States, residing, respectively, at Kirkland and Seattle, in the county of King and State of Washington, have invented certain new and useful Improvements in Automatic Camera-Shutter Trips, of which the following is a specification.

This invention relates to camera attachments and especially to shutter-trip actuating devices.

The object of our invention is the provision of inexpensively constructed and easily applied devices which may be regulated to actuate the shutter subsequent to the operator placing himself in the field of the camera so that he may appear in the picture.

The invention consists in the novel construction, arrangement and combination of parts as will be hereinafter described and claimed.

In the accompanying drawings, Figure 1 is a perspective view of a camera of the box type with devices embodying our invention applied thereto.

Fig. 2 is a longitudinal section of the spring operated motor shown in Fig. 1.

Fig. 3 is a perspective rear view of the motor attaching device shown detached.

Fig. 4 is a sectional view through broken lines 4—4 of Fig. 2.

Referring to said drawings, the numeral 5 designates a cylinder having in one of its heads an air inlet 6 which is controlled by a needle valve 7 passing through a screw threaded hole in a dust cap 8. A piston 9 operable within said cylinder has a hollow rod 10 extending through the other head 11 of the cylinder and carrying a removable disk $10^1$ at its outer end.

An extensible spring 12 mounted upon a guide rod 13 and extending into the piston rod 10 tends to urge the latter in the direction of arrow A, Fig. 2, in opposition to suction obtaining against the rear side of the piston and atmospheric pressure admitted into the forward end of cylinder through a vent hole 14.

At the front end of the cylinder is a spring actuated latch 15 engageable in a peripheral notch 16 provided in said piston rod to releasably hold the same in its retracted position. 17 represents a clamping band which is secured in adjusted position to said cylinder by means of a screw 18.

20 represents a plate having near its upper end an aperture 21 to receive a stud 19 provided on the band 17 and is secured thereto by a nut 29. Extending rearwardly from said plate at about the midlength of the latter is a transversely arranged tongue 22 and a second tongue 23 at right angles thereto extends from a side of the plate. The tongues 22 and 23 are arranged to respectively engage in interstices 24 and 25 obtaining between the top and side walls 26 and 27 of a camera case (Fig. 1) and the inserted end wall 28 thereof.

The tongues 22 and 23 are arranged so that when engaging the plate to the camera the cylinder will be held in position to seat upon the camera and be secured by the plate against axial movement.

The cylinder is furthermore disposed to have its axis in approximately the plane of the shutter operating lever 30.

This lever for a box camera as shown in Fig. 1, is directly engaged by the disk $10^1$ to push the lever there-in-front for operating the shutter.

To repeat such operation the lens opening 31 of the camera may be closed by the photographer placing thereover his hand or other object to exclude light while the shutter is being inoperatively affected in returning the lever to its original position.

The piston 9 is also returned in opposition to spring 12 into its retracted position until the rod 10 is engaged by latch 15. When the latch is disengaged from the rod the spring 12 asserts its power to push piston 9, rod 10 and disk $10^1$ forward but by reason of the resistance due, a partial vacuum, so to speak, obtaining at the rear of the piston, the latter is caused to move relatively slow until it passes beyond the vent hole 14 whereupon free communication is established with the external atmosphere and the spring then serves to impart a rapid motion to the piston and associated parts.

By regulating the effective size of opening 6 by means of valve 7 it is apparent that the initial speed of the disk $10^1$ may be rendered slow to afford time for the photographer to get into position to be included in the picture which is attained by the opening of the shutter which occurs during the rapid final travel of the disk.

The construction and operation of the invention will be understood from the foregoing description.

What we claim, is—

1. The combination with a camera having a casing having openings along the top and one of the side walls thereof, and a shutter-operating lever protruding from said casing, a spring actuated motor for operating said lever, and means to regulate the action of said motor, of a plate provided with rearwardly extending tongues adapted to engage in the respective camera openings, and means for detachably connecting said plate to said motor for retaining the latter in operative relations with said lever.

2. The combination with a camera having a casing with an end wall inclosed by side, top and bottom walls, and a shutter-operating lever protruding from said top wall, and a spring actuated motor for operating said lever, of means engaging in an interstice between said end wall and one of said side walls for securing said motor upon said casing.

CHARLES L. E. SVENDSEN.
CHARLES A. JOHNSON.

Witnesses:
PIERRE BARNES,
ELIZABETH JOHNSON.